United States Patent
Lynch

(10) Patent No.: US 11,394,815 B2
(45) Date of Patent: *Jul. 19, 2022

(54) ELECTRONIC DEVICES WITH CONVEX DISPLAYS

(71) Applicant: Apple Inc., Cupertino, CA (US)

(72) Inventor: Stephen Brian Lynch, Portola Valley, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/925,175

(22) Filed: Jul. 9, 2020

(65) Prior Publication Data
US 2020/0344341 A1 Oct. 29, 2020

Related U.S. Application Data

(63) Continuation of application No. 15/879,307, filed on Jan. 24, 2018, now Pat. No. 10,735,569, which is a (Continued)

(51) Int. Cl.
*G02F 1/1333* (2006.01)
*H04M 1/02* (2006.01)
*G06F 1/16* (2006.01)

(52) U.S. Cl.
CPC .... *H04M 1/0266* (2013.01); *G02F 1/133308* (2013.01); *G06F 1/1637* (2013.01); *H04M 1/0202* (2013.01); *H04M 1/0268* (2013.01)

(58) Field of Classification Search
CPC .. G06F 1/1637; G06F 1/1652; H04M 1/0266; H04M 1/026; H04M 1/0268;
(Continued)

(56) References Cited

U.S. PATENT DOCUMENTS 4,066,855 A 1/1978 Zenk
4,085,302 A 4/1978 Zenk et al.
(Continued)

FOREIGN PATENT DOCUMENTS

CN 1678945 10/2005
CN 1254665 5/2006
(Continued)

OTHER PUBLICATIONS

Concise Description of Relevance of United States Patent Publication No. US 2007-0202917 Submitted Under 35 U.S.C. § 122(E) and 37 C.F.R. § 1.290 submitted Mar. 19, 2013, for U.S. Appl. No. 13/171,295, filed Jun. 28, 2011, 3 pages.
(Continued)

*Primary Examiner* — Thoi V Duong
(74) *Attorney, Agent, or Firm* — Treyz Law Group, P.C.; Kendall P. Woodruff

(57) ABSTRACT

Electronic devices may be provided with convex displays. A convex display may be used to maximize the internal volume of a device. Convex displays may be formed from one or more flexible layers. A flexible display layer may be mounted to a rigid support structure or a rigid cover layer. Flexible display layers that conform to the curved shape of a rigid structure may provide additional internal volume in which internal components of the device may be positioned.

19 Claims, 10 Drawing Sheets

Related U.S. Application Data continuation of application No. 15/690,065, filed on Aug. 29, 2017, now Pat. No. 10,348,875, which is a continuation of application No. 14/866,703, filed on Sep. 25, 2015, now Pat. No. 9,756,158, which is a continuation of application No. 13/184,303, filed on Jul. 15, 2011, now Pat. No. 9,178,970.

(60) Provisional application No. 61/454,950, filed on Mar. 21, 2011.

(58) Field of Classification Search
CPC ............... H04M 1/0202; G02F 1/1333; G02F 1/133308; G02F 1/133331; G02F 1/13332; G02F 1/133314; G02F 1/133305; G02F 1/133325
See application file for complete search history.

(56) References Cited

U.S. PATENT DOCUMENTS

| | | |
|---|---|---|
| 5,483,261 A | 1/1996 | Yasutake |
| 5,488,204 A | 1/1996 | Mead et al. |
| 5,589,856 A | 12/1996 | Stein et al. |
| 5,825,352 A | 10/1998 | Bisset et al. |
| 5,835,079 A | 11/1998 | Shieh |
| 5,880,411 A | 3/1999 | Gillespie et al. |
| 6,035,180 A | 3/2000 | Kubes et al. |
| 6,067,074 A | 5/2000 | Lueders |
| 6,188,391 B1 | 2/2001 | Seely et al. |
| 6,310,610 B1 | 10/2001 | Beaton et al. |
| 6,323,846 B1 | 11/2001 | Westermann et al. |
| 6,690,387 B2 | 2/2004 | Zimmerman et al. |
| 6,803,245 B2 | 10/2004 | Auch et al. |
| 6,879,319 B2 | 4/2005 | Cok |
| 7,015,894 B2 | 3/2006 | Morohoshi |
| 7,034,913 B2 | 4/2006 | Ishida |
| 7,184,064 B2 | 2/2007 | Zimmerman et al. |
| 7,188,989 B2 | 3/2007 | Miyashita |
| 7,324,093 B1 | 1/2008 | Gettemy et al. |
| 7,382,357 B2 | 6/2008 | Panotopoulos et al. |
| 7,382,890 B2 | 6/2008 | Saiki |
| 7,541,671 B2 | 6/2009 | Foust et al. |
| 7,657,042 B2 | 2/2010 | Miyata |
| 7,663,607 B2 | 2/2010 | Hotelling et al. |
| 7,714,801 B2 | 5/2010 | Kimmel |
| 7,834,451 B2 | 11/2010 | Lee et al. |
| RE42,199 E | 3/2011 | Caldwell |
| 7,920,223 B2 | 4/2011 | Nishizawa et al. |
| 8,027,503 B2 | 9/2011 | Konuma et al. |
| 8,199,124 B2 | 6/2012 | Ciesla et al. |
| 9,756,158 B2 | 9/2017 | Lynch |
| 10,735,569 B2 * | 8/2020 | Lynch ............... H04M 1/0202 |
| 2002/0001187 A1 | 1/2002 | Murofushi |
| 2002/0047952 A1 | 4/2002 | Kawata |
| 2002/0071082 A1 | 6/2002 | Okita et al. |
| 2002/0093602 A1 | 7/2002 | Kawata |
| 2003/0003879 A1 | 1/2003 | Saiki et al. |
| 2003/0227441 A1 | 12/2003 | Hioki |
| 2005/0025330 A1 | 2/2005 | Saiki et al. |
| 2005/0140646 A1 | 6/2005 | Nozawa |
| 2005/0226455 A1 | 10/2005 | Aubauer et al. |
| 2006/0022952 A1 | 2/2006 | Ryynanen |
| 2006/0026521 A1 | 2/2006 | Hotelling et al. |
| 2006/0132025 A1 | 6/2006 | Gao et al. |
| 2006/0197753 A1 | 9/2006 | Hotelling |
| 2006/0238494 A1 | 10/2006 | Narayanaswami |
| 2006/0268528 A1 | 11/2006 | Zadesky et al. |
| 2006/0273304 A1 | 12/2006 | Cok |
| 2007/0103776 A1 | 5/2007 | Cok et al. |
| 2007/0202917 A1 | 8/2007 | Phelps |
| 2007/0242033 A1 | 10/2007 | Cradick et al. |
| 2007/0247422 A1 | 10/2007 | Vertegaal et al. |
| 2007/0247429 A1 | 10/2007 | Westerman |
| 2007/0258604 A1 | 11/2007 | Bosnecker |
| 2008/0060856 A1 | 3/2008 | Shahoian et al. |
| 2008/0146285 A1 | 6/2008 | Lee et al. |
| 2008/0204367 A1 | 8/2008 | Lafarre et al. |
| 2008/0260188 A1 | 10/2008 | Kim |
| 2008/0291225 A1 | 11/2008 | Arneson |
| 2008/0303782 A1 | 12/2008 | Grant et al. |
| 2008/0305838 A1 | 12/2008 | Joo |
| 2009/0015747 A1 | 1/2009 | Nishizawa et al. |
| 2009/0082103 A1 | 3/2009 | Lube |
| 2009/0096965 A1 | 4/2009 | Nagata |
| 2009/0161048 A1 | 6/2009 | Satake et al. |
| 2009/0167171 A1 | 7/2009 | Jung et al. |
| 2009/0201443 A1 | 8/2009 | Sasaki et al. |
| 2009/0219247 A1 | 9/2009 | Watanabe et al. |
| 2009/0219259 A1 | 9/2009 | Kwon |
| 2009/0247237 A1 | 10/2009 | Mittleman et al. |
| 2009/0256471 A1 | 10/2009 | Kim et al. |
| 2010/0006845 A1 | 1/2010 | Seo et al. |
| 2010/0026952 A1 | 2/2010 | Miura et al. |
| 2010/0045705 A1 | 2/2010 | Vertegaal et al. |
| 2010/0052521 A1 | 3/2010 | Kim et al. |
| 2010/0060548 A1 | 3/2010 | Choi et al. |
| 2010/0061039 A1 | 3/2010 | Sanford et al. |
| 2010/0061040 A1 | 3/2010 | Dabov et al. |
| 2010/0064564 A1 | 3/2010 | Bemelmans et al. |
| 2010/0073593 A1 | 3/2010 | Sasaki |
| 2010/0103115 A1 | 4/2010 | Hainzil |
| 2010/0110041 A1 | 5/2010 | Jang |
| 2010/0117975 A1 | 5/2010 | Cho |
| 2010/0120473 A1 | 5/2010 | Oh |
| 2010/0162109 A1 | 6/2010 | Chatterjee et al. |
| 2010/0164888 A1 | 7/2010 | Okumura |
| 2010/0177113 A1 | 7/2010 | Gay et al. |
| 2010/0188422 A1 | 7/2010 | Shingai et al. |
| 2010/0238367 A1 | 9/2010 | Montgomery et al. |
| 2010/0238612 A1 | 9/2010 | Hsiao et al. |
| 2010/0260351 A1 | 10/2010 | Diethorn et al. |
| 2010/0265187 A1 | 10/2010 | Chang et al. |
| 2010/0265206 A1 | 10/2010 | Chen |
| 2010/0289760 A1 | 11/2010 | Jonoshita et al. |
| 2010/0315399 A1 | 12/2010 | Jacobson et al. |
| 2010/0317409 A1 | 12/2010 | Jiang et al. |
| 2011/0012845 A1 | 1/2011 | Rothkopf et al. |
| 2011/0014955 A1 | 1/2011 | Kim et al. |
| 2011/0037734 A1 | 2/2011 | Pance et al. |
| 2011/0050657 A1 | 3/2011 | Yamada |
| 2011/0074720 A1 | 3/2011 | Ozaki |
| 2011/0086680 A1 | 4/2011 | Kim et al. |
| 2011/0186899 A1 | 8/2011 | van Lieshout |
| 2011/0227848 A1 | 9/2011 | Furusawa |
| 2011/0234502 A1 | 9/2011 | Yun et al. |
| 2011/0261002 A1 | 10/2011 | Verthein |
| 2011/0273383 A1 | 11/2011 | Jeon et al. |
| 2011/0275350 A1 | 11/2011 | Weltlinger et al. |
| 2012/0111479 A1 | 5/2012 | Sung et al. |
| 2012/0127087 A1 | 5/2012 | Ma |
| 2012/0211148 A1 | 8/2012 | Sung et al. |
| 2012/0218219 A1 | 8/2012 | Rappoport et al. |
| 2012/0242588 A1 | 9/2012 | Myers et al. |
| 2012/0242592 A1 | 9/2012 | Rothkopf et al. |
| 2012/0243719 A1 | 9/2012 | Franklin et al. |
| 2013/0010405 A1 | 1/2013 | Rothkopf et al. |
| 2013/0021289 A1 | 1/2013 | Chen et al. |
| 2013/0063891 A1 | 3/2013 | Martisauskas |
| 2013/0076649 A1 | 3/2013 | Myers et al. |
| 2013/0081756 A1 | 4/2013 | Franklin et al. |
| 2013/0082984 A1 | 4/2013 | Drzaic et al. |
| 2013/0083491 A1 | 4/2013 | Rappoport et al. |
| 2013/0083496 A1 | 4/2013 | Franklin et al. |
| 2013/0094126 A1 | 4/2013 | Rappoport et al. |
| 2013/0135212 A1 | 5/2013 | Cheng et al. |
| 2013/0140965 A1 | 6/2013 | Franklin et al. |
| 2013/0279088 A1 | 10/2013 | Raff et al. |
| 2014/0362020 A1 | 12/2014 | Rothkopf et al. |

FOREIGN PATENT DOCUMENTS

| | | |
|---|---|---|
| CN | 101674361 | 3/2010 |
| CN | 101739171 A | 6/2010 |

(56) References Cited

FOREIGN PATENT DOCUMENTS

| | | |
|---|---|---|
| CN | 101782804 | 7/2010 |
| CN | 101963864 B | 3/2013 |
| DE | 10143275 | 4/2003 |
| EP | 0929027 | 7/1999 |
| EP | 1 635 313 | 3/2006 |
| EP | 1827057 | 8/2007 |
| EP | 1 970 886 | 9/2008 |
| EP | 2187443 | 5/2010 |
| EP | 2 192 750 | 6/2010 |
| EP | 2202624 | 6/2010 |
| JP | Hei 6-66969 | 3/1994 |
| JP | 2010171620 | 6/1998 |
| JP | H11-143606 A | 5/1999 |
| JP | 20000063031 | 6/2000 |
| JP | 2000-293117 | 10/2000 |
| JP | 2001061194 | 3/2001 |
| JP | 2001069213 A | 3/2001 |
| JP | 2001-154592 | 6/2001 |
| JP | 2001189978 | 7/2001 |
| JP | 2001519585 | 10/2001 |
| JP | 2002049021 A | 2/2002 |
| JP | 2002232992 | 8/2002 |
| JP | 2002342033 | 11/2002 |
| JP | 2003-015796 A | 1/2003 |
| JP | 200315795 | 1/2003 |
| JP | 2003125315 | 4/2003 |
| JP | 2003179988 | 6/2003 |
| JP | 2003-211087 | 7/2003 |
| JP | 2003-208548 | 10/2003 |
| JP | 2003280546 | 10/2003 |
| JP | 2004069627 A | 3/2004 |
| JP | 2004173264 | 6/2004 |
| JP | 2005-091873 | 4/2005 |
| JP | 2005-099159 A | 4/2005 |
| JP | 2005110216 | 4/2005 |
| JP | 2006-005712 A | 1/2006 |
| JP | 2006270834 | 10/2006 |
| JP | 2007-41985 | 2/2007 |
| JP | 2007-072375 A | 3/2007 |
| JP | 2007-264923 A | 10/2007 |
| JP | 2007-272107 | 10/2007 |
| JP | 2008083491 | 4/2008 |
| JP | 2008-530611 A | 8/2008 |
| JP | 2008-234549 | 10/2008 |
| JP | 2008233779 | 10/2008 |
| JP | 2008283350 | 11/2008 |
| JP | 2009-020168 A | 1/2009 |
| JP | 2009-086560 A | 4/2009 |
| JP | 2009194223 | 8/2009 |
| JP | 2009-205565 | 9/2009 |
| JP | 2010-008480 | 1/2010 |
| JP | 2010-095659 A | 4/2010 |
| JP | 3159716 | 5/2010 |
| JP | 2010-152888 A | 7/2010 |
| JP | 2010-157060 | 7/2010 |
| JP | 2010153813 | 7/2010 |
| JP | 2010-529555 A | 8/2010 |
| JP | 2010-191246 | 9/2010 |
| JP | 2010-15288 | 10/2010 |
| JP | 1400563 | 11/2010 |
| JP | 2010251304 A | 11/2010 |
| JP | 2010257259 A | 11/2010 |
| JP | 2010262275 A | 11/2010 |
| JP | 2011-003537 A | 1/2011 |
| JP | 2011034029 A | 2/2011 |
| JP | 2011-044126 A | 3/2011 |
| JP | 2011-507088 A | 3/2011 |
| JP | 2011047976 | 3/2011 |
| JP | 2012502355 | 1/2012 |
| KR | 10-2003-0017628 | 3/2003 |
| KR | 10-2005-0013578 | 2/2005 |
| WO | 9918590 | 4/1999 |
| WO | 2002-095342 | 11/2002 |
| WO | 02095342 | 11/2002 |
| WO | 03107169 | 12/2003 |
| WO | 2007082114 | 7/2007 |
| WO | 2009/034982 A1 | 3/2009 |
| WO | 2009-050812 | 4/2009 |
| WO | 2010027565 | 3/2010 |
| WO | 2010041227 A1 | 4/2010 |
| WO | 2013032584 | 3/2013 |
| WO | 2013165582 | 11/2013 |

OTHER PUBLICATIONS

Concise Description of Relevance of United States Patent Publication No. US 2008-0305838 Submitted Under 35 U.S.C. § 122(E) and 37 C.F.R. § 1.290 submitted Mar. 19, 2013, for U.S. Appl. No. 13/171,298, filed Jun. 28, 2011, 3 pages.

Concise Description of Relevance of United States Patent Publication No. US 2006-0238494 Submitted Under 35 U.S.C. § 122(E) and 37 C.F.R. § 1.290 submitted Mar. 19, 2013, for U.S. Appl. No. 13/171,298, filed Jun. 28, 2011, 3 pages.

Concise Description of Relevance of United States Patent Publication No. US 2003-0227441 Submitted Under 35 U.S.C. § 122(E) and 37 C.F.R. § 1.290 submitted Mar. 19, 2013, for U.S. Appl. No. 13/171,298, filed Jun. 28, 2011, 3 pages.

Concise Description of Relevance of Japanese Patent Publication No. JP 2003-211087 Submitted Under 35 U.S.C. § 122(E) and 37 C.F.R. § 1.290 submitted Mar. 19, 2013, for U.S. Appl. No. 13/171,298, filed Jun. 28, 2011, 3 pages.

Patent Cooperation Treaty Third Party Observation submitted Jun. 14, 2013, for International Patent Application No. PCT/2012/029844 filed on Mar. 20, 2012, 6 pages.

Patent Cooperation Treaty Third Party Observation submitted Jun. 14, 2013, for International Patent Application No. PCT/2012/029844 filed on Mar. 20, 2012, 4 pages.

Patent Cooperation Treaty Third Party Observation submitted Jun. 14, 2013, for International Patent Application No. PCT/2012/029844 filed on Mar. 20, 2012, 3 pages.

Concise Description of Relevance of Japanese Patent Publication No. JP 2001-154592 Submitted Under 35 U.S.C. § 122(E) and 37 C.F.R. § 1.290 submitted Mar. 19, 2013, for U.S. Appl. No. 13/184,303, filed Jul. 15, 2011, 5 pages.

Concise Description of Relevance of Japanese Patent Publication No. HEI6-66969 Submitted Under 35 U.S.C. § 122 (E) and 37 C.F.R. § 1.290 submitted Mar. 19, 2013, for U.S. Appl. No. 13/184,303, filed Jul. 15, 2011, 3 pages.

Concise Description of Relevance of Japanese Patent Publication No. JP 2003-280548 Submitted Under 35 U.S.C. § 122(E) and 37 C.F.R. § 1.290 submitted Mar. 19, 2013, for U.S. Appl. No. 13/184,303, filed Jul. 15, 2011, 4 pages.

Concise Description of Relevance of Japanese Patent Publication No. JP 2000-293117 Submitted Under 35 U.S.C. § 122(E) and 37 C.F.R. § 1.290 submitted Mar. 19, 2013, for U.S. Appl. No. 13/184,303, filed Jul. 15, 2011, 3 pages.

Concise Description of Relevance of Japanese Patent Publication No. JP 2010-008480 Submitted Under 35 U.S.C. § 122(E) and 37 C.F.R. § 1.290 submitted Mar. 19, 2013, for U.S. Appl. No. 13/184,303, filed Jul. 15, 2011, 5 pages.

Concise Description of Relevance of Japanese Patent Publication No. JP 2003-15795 Submitted Under 35 U.S.C. § 122(E) and 37 C.F.R. § 1.290 submitted Oct. 3, 2013, for U.S. Appl. No. 13/250,227, filed Sep. 30, 2011, 7 pages.

Concise Description of Relevance of Japanese Patent Publication No. JP 2002-0071082 Submitted Under 35 U.S.C. § 122(E) and 37 C.F.R. § 1.290 submitted Oct. 3, 2013, for U.S. Appl. No. 13/250,227, filed Sep. 30, 2011, 5 pages.

Concise Description of Relevance of Japanese Patent Publication No. JP 2008-233779 Submitted Under 35 U.S.C. § 122(E) and 37 C.F.R. § 1.290 submitted Oct. 3, 2013, for U.S. Appl. No. 13/250,227, filed Sep. 30, 2011, 5 pages.

Concise Description of Relevance of Japanese Patent Publication No. JP 2010-171620 Submitted Under 35 U.S.C. § 122(E) and 37 C.F.R. § 1.290 submitted Oct. 3, 2013, for U.S. Appl. No. 13/250,227, filed Sep. 30, 2011, 5 pages.

(56) References Cited

OTHER PUBLICATIONS

Takamatsu et al., "Transparent conductive-polymer strain sensors for touch input sheets of flexible displays" Journal of Micromechanics and Microengineering, J. Micromech. Microeng. 20 (2010) 075017 (6pp).
Bhattacharya et al., "Organic LED Pixel Array on a Dome" The IEEE, vol. 93, No. 7, Jul. 2005.
Stedmon et al., "Sound and Tangible Interfaces for Novel product design" Satin, Nov. 2007.
Wagner et al., "Flexible thin-film transistor backplanes" Department of Electrical Engineering, and Princeton Institute for the Science and Technology of Materials.
Toda, Thinking of Whether to Buy or Not, The Greatest Smartphone, Singlehandedly "No Match" for the iPhone 4 (32 GB), Nikkei PC21, Nikkei BP, Jul. 24, 2010, No. 15, vol. 14, pp. 148-151.
5th Generation iPad nano: A staple of audio players having a video camera installed, having been further perfected, Mac Fan, Japan, Mainichi Communications Inc., Issued Nov. 1, 2009, vol. 17, issue 11, pp. 26 to 29.

\* cited by examiner

ELECTRONIC DEVICES WITH CONVEX DISPLAYS

This application is a continuation of U.S. Ser. No. 15/879,307, filed Jan. 24, 2018, which is a continuation of U.S. patent application Ser. No. 15/690,065, filed Aug. 29, 2017, now U.S. Pat. No. 10,348,875, which is a continuation of U.S. patent application Ser. No. 14/866,703, filed Sep. 25, 2015, now U.S. Pat. No. 9,756,158, which is a continuation of U.S. patent application Ser. No. 13/134,303, filed on Jul. 15, 2011, now U.S. Pat. No. 9,176,970, which claims the benefit of provisional patent application No. 61/454,950, filed Mar. 21, 2011, all of which are hereby incorporated by reference herein in their entireties.

BACKGROUND

This relates generally to displays, and more particularly, to electronic devices with displays.

Electronic devices such as portable computers and cellular telephones are often provided with displays. For example, a liquid crystal display (LCD) may be formed from a stack of display structures such as an thin-film transistor layer with display pixels for providing visual information to a user, a color filter layer for providing the display pixels with color, a touch screen panel for gathering touch input from a user, and a cover glass layer for protecting the display and internal components.

It is often desirable to produce portable devices of minimal size. Users of portable electronic devices may find a thinner device more desirable than a thicker device. Compact portable devices are sometimes provided with convex housing shapes. A convex housing shape may increase the internal volume of a device while preserving a sleek, thin look that is aesthetically pleasing to a user.

A portable compact device with a convex housing may have a display. In conventional arrangements, the display is flat, so only the portions of the device other than the display have a convex shape. This may limit the internal volume of the device and may detract from its appearance.

It would therefore be desirable to be able to provide improved electronic devices.

SUMMARY

Electronic devices may be provided with convex displays.

The convex displays may include one or more flexible display layers and may be mounted on top of or under a cover layer with a curved shape. For example, a flexible display layer may be mounted on top of a rigid support member having a convex surface or may be mounted on the concave underside of a rigid convex display cover layer.

Convex displays may be provided with touch-sensitive capabilities by stacking a touch sensor array on top of or under flexible display layers. Rigid convex displays may be formed from a flexible display layer, a touch-sensitive layer, and a rigid cover layer or support structure.

Devices having convex displays formed from curved flexible display layers may help maximize the use of the internal volume of an electronic device.

Further features of the invention, its nature and various advantages will be more apparent from the accompanying drawings and the following detailed description of the preferred embodiments.

DETAILED DESCRIPTION

An electronic device may be provided with a convex display. The convex display may include a flexible display layer that has been bent to form a curved surface.

Convex displays may be formed from flexible layers such as a flexible display layer (e.g., a flexible organic light-emitting diode array), a flexible touch-sensitive layer (e.g., a sheet of polymer with an array of transparent capacitor electrodes for a capacitive touch sensor), a flexible substrate layer, etc. These flexible layers may, if desired, be covered by a flexible or rigid cover layer (sometimes referred to as a cover glass) or may be supported by a support structure (e.g., a rigid support structure on the underside of the flexible layers). In electronic devices with convex displays partially covered by rigid cover layers, the cover layers may be provided with openings that provide access to the flexible layers of the display. For example, a cover glass layer may have an opening that allows a button member to move relative to the cover glass layer. As the button member moves within the opening, underlying portions of the flexible display may be deformed (e.g., to allow actuation of an associated switch).

Electronic devices may also be provided with user interface components (input-output components) such as buttons, microphones, speakers, piezoelectric actuators or (for receiving electrical input from a user or tactile feedback to users), other actuators such as vibrators, pressure sensors, and other components. These components may foe mounted under portions of a flexible display.

User interface components may be mounted under the flexible display or may be integrated into the flexible display. The deformable nature of the flexible display may allow a user to interact with the user interface components (input-output components) by moving the display into contact with the user interface components or by otherwise allowing the display to locally flex (e.g., to allow sound to pass through the flexible display or to allow a barometric pressure measurements of the exterior environment to be made by an internal pressure sensor). If desired, a portion of the flexible display may form a membrane portion of an electrical component. Components that may be provided with a membrane that is formed from a portion of a flexible display include microphones, laser microphones, pressure sensors, speakers, etc.

Convex displays formed from flexible and rigid layers that all have convex shapes i.e., displays formed from a collection of layers in which no layer of the display is planar) may provide an aesthetically desirable external appearance while maximizing the internal volume of the device that is available to hold electrical and mechanical device components.

Figure 1:
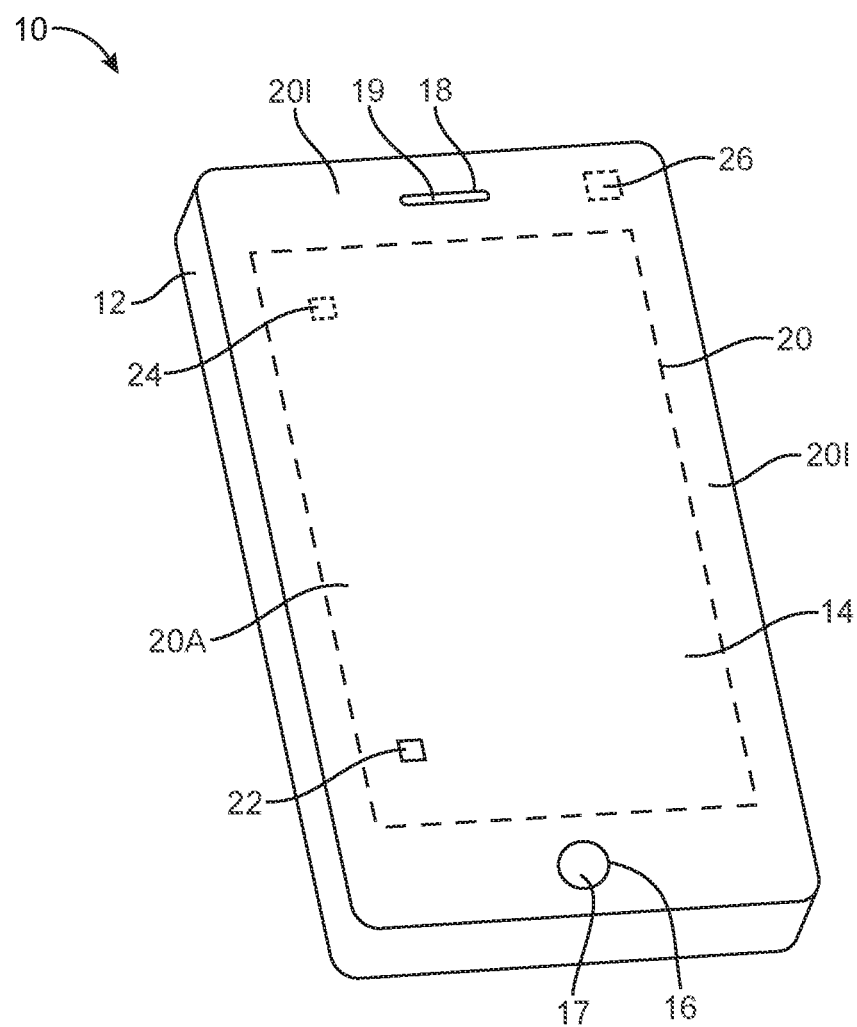
FIG. 1 is a perspective view of an illustrative electronic device with a convex display and internal components in accordance with an embodiment of the present invention.

An illustrative electronic device of the type that may be provided with a convex display is shown in FIG. 1. Electronic device 10 may be a portable electronic device or other suitable electronic device. For example, electronic device 10 may be a laptop computer, a tablet computer, a somewhat smaller device such as a wrist-watch device, pendant device, or other wearable or miniature device, a cellular telephone, a media player, etc.

Device 10 may include a housing such as housing 12. Housing 12, which may sometimes be referred to as a case, may be formed of plastic, glass, ceramics, fiber composites, metal (e.g., stainless steel, aluminum, etc.), other suitable materials, or a combination of these materials. In some situations, parts of housing 12 may be formed from dielectric or other low-conductivity material. In other situations, housing 12 or at least some of the structures that make up housing 12 may be formed from metal elements.

Device 10 may have a convex display such as convex display 14. Convex display 14 may be formed from multiple layers of material. These layers may include a touch sensor layer such as a layer on which a pattern of indium tin oxide (ITO) electrodes or other suitable transparent electrodes have been deposited to form a capacitive touch sensor array or a touch sensor layer formed using other touch technologies (e.g., resistive touch, acoustic touch, optical touch, etc.). These layers may also include layer that contains an array of display pixels. The touch sensor layer and the display layer may be formed using flexible sheets of polymer or other substrates having thicknesses of 10 microns to 0.5 mm or other suitable thicknesses (as an example).

The display pixel array may be, for example, an organic light-emitting diode (OLED) array containing rows and columns of OLED display pixels. Other types of flexible display pixel arrays may also be formed (e.g., electronic ink displays, etc.). The use of OLED technology to form flexible display 14 is sometimes described herein as an example. This is, however, merely illustrative. Flexible display 14 may be formed using any suitable flexible display technology. The use of flexible displays that are based on OLED technology is merely illustrative.

In addition to these functional display layers (i.e., the OLED array and the optional touch sensor array), display 14 may include one or more structural layers. For example, display 14 may be covered with a flexible or rigid cover layer and/or may be mounted on a support structure (e.g., a rigid support). Layers of adhesive may be used in attaching flexible display layers to each other and may be used in mounting flexible display layers to rigid and flexible structural layers.

In configurations for display 14 in which the cover layer for display 14 is flexible, input-output components that rely on the presence of flexible layers may be mounted at any suitable location under the display (e.g., along peripheral portions of the display, in a central portion of the display, etc.). In configurations for display 14 in which the flexible layers are covered by a rigid cover glass layer or other rigid cover layer, the rigid layer may be provided with one or more openings and the electronic components may be mounted under the openings. For example, a rigid cover layer may have openings such as a circular opening 16 for button 17 and a speaker port opening such as speaker port opening 18 (e.g., for an ear speaker for a user). Device 10 may also have other openings (e.g., openings in display 14 and/or housing 12 for accommodating volume buttons, ringer buttons, sleep buttons, and other buttons, openings for an audio jack, data port connectors, removable media slots, etc.).

In some embodiments, portions of convex display 14 such as peripheral regions 20I may be inactive and portions of display 14 such as rectangular central portion 20A (bounded by dashed line 20) may correspond to the active part of display 14. In active display region 20A, an array of image pixels may be used to present text and images to a user of device 10. In active region 20A, display 14 may include touch sensitive components for input and interaction with a user of device 10. If desired, regions such as regions 20I and 20A in FIG. 1 may both be provided with display pixels (i.e., all or substantially all of the entire front planar surface of a device such as device 10 may be covered with display pixels).

Device 10 may, if desired, have internal user interface components such as buttons 17 or speaker component 19 that occupy openings such as openings 16 and 18 respectively in an optional rigid cover layer of convex display 14. Buttons 17 may be based on dome switches or other switch circuitry. Buttons 17 may include button members that form push buttons (e.g., momentary buttons), slider switches, rocker switches, etc. Device 10 may include internal structural components such as structural component 22 that add a raised structure to a portion of convex display 14. Device 10 may include components such as interface components 24 and 26 that may be fully internal to device 10, but that receive input from the user or from the surrounding environment through physical interaction with convex display 14. Interface components 22, 24, and 26 may be positioned in active region 20A or inactive region 20I of convex display 14. Interface components 22, 24, and 26 may be positioned separately from one another or may be commonly located to form a combined component with structural and internal features. Interface components 24 and 26 may be positioned underneath convex display 14 so that convex display 14 must be deformed in order to contact components 24 or 26 or, if desired may be positioned to remain in constant contact with convex display 14.

Figure 2:
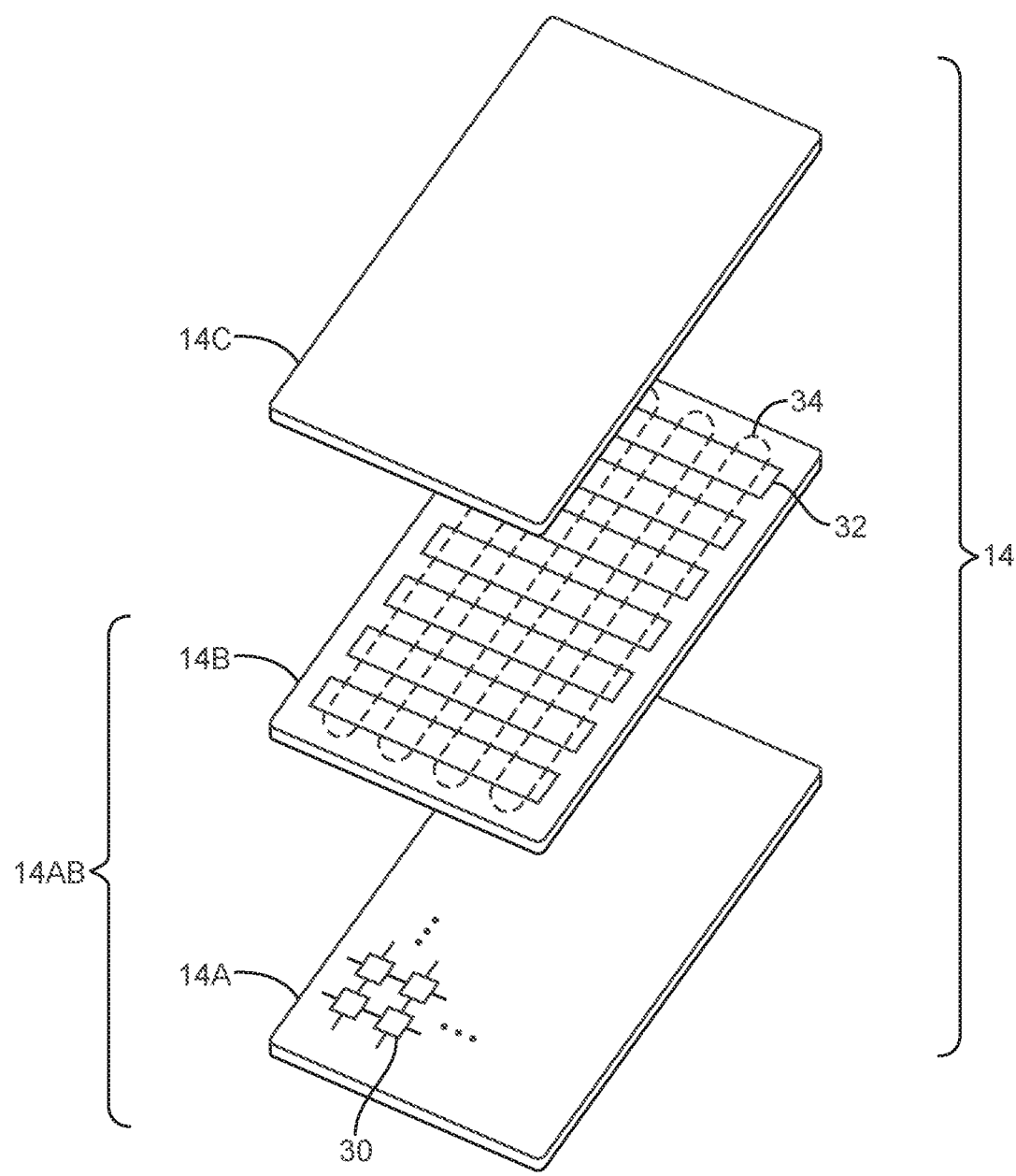
FIG. 2 is a diagram of an illustrative set of display layers that make up a convex display in accordance with an embodiment of the present invention.

An exploded perspective view of an illustrative display is shown in FIG. 2. As shown in FIG. 2, convex display 14 may be formed by stacking multiple layers including flexible display layer 14A, touch-sensitive layer 14B, and cover layer 14C. Display 14 may also include other layers of material such as adhesive layers, optical films, or other suitable layers. Flexible display layer 14 may include image pixels formed form light-emitting diodes (LEDs), organic LEDs (OLEDs), plasma cells, electronic ink elements, liquid crystal display (LCD) components, or other suitable image pixel structures compatible with flexible displays.

Touch-sensitive layer 14B may incorporate capacitive touch electrodes such as horizontal transparent electrodes 32 and vertical transparent electrodes 34. Touch-sensitive layer 14B may, in general, be configured to detect the location of one or more touches or near touches on touch-sensitive layer 14B based on capacitive sensors, resistive sensors, optical sensors, acoustic sensors, inductive sensors, or force sensors.

Software and/or hardware may be used to process the measurements of the detected touches to identify and track one or more gestures. A gesture may correspond to stationary or non-stationary, single or multiple, touches or near touches on touch-sensitive layer 14B. A gesture may be performed by moving one or more fingers or other objects in a particular manner on touch-sensitive layer 14B such as tapping, pressing, rocking, scrubbing, twisting, changing orientation, pressing with varying pressure and the like at essentially the same time, contiguously, or consecutively. A gesture may be characterized by, but is not limited to a pinching, sliding, swiping, rotating, flexing, dragging, or tapping motion between or with any other finger or fingers. A single gesture may be performed with one or more hands, by one or more users, or any combination thereof.

Cover layer 140 may be formed from plastic or glass (sometimes referred to as display cover glass) and may be flexible or rigid. If desired, the interior surface of peripheral inactive portions 20I of cover layer 14C may be provided with an opaque masking layer on such as black ink.

Touch-sensitive flexible display section 14AB may be formed from display pixel array layer 14A and optional touch sensor layer 14B.

Figure 3:
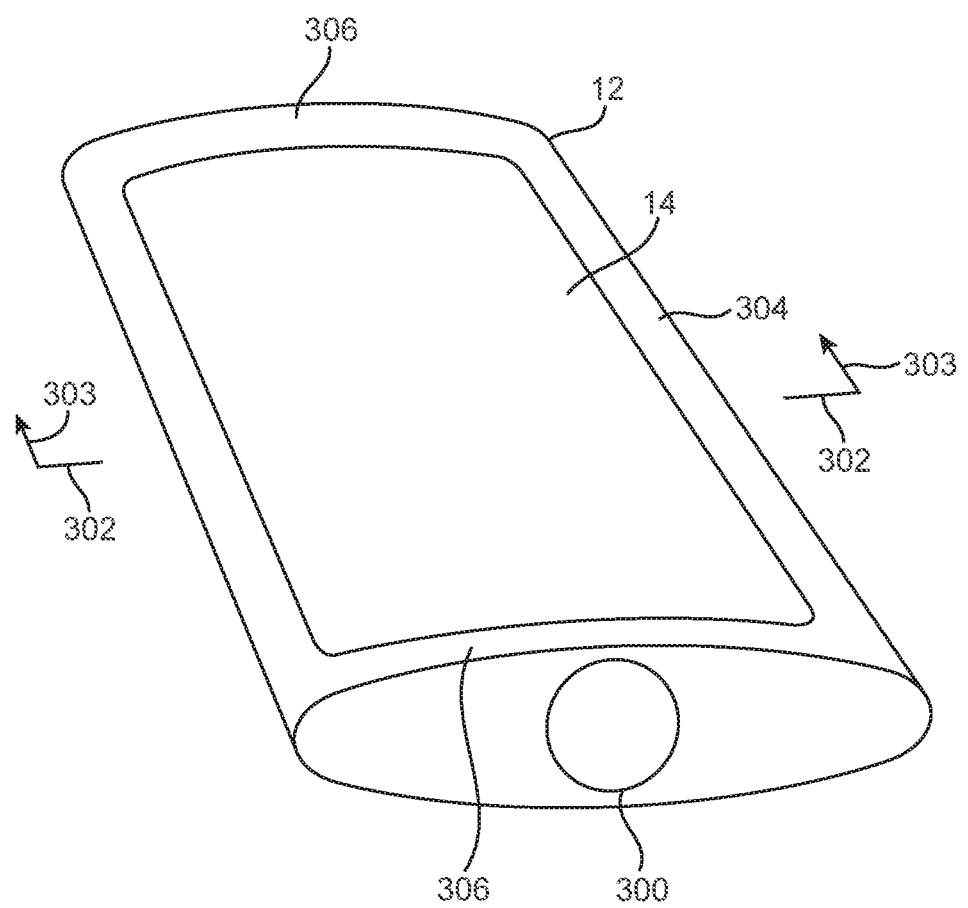
FIG. 3 is a perspective view of an illustrative electronic device with a convex display and a bezel formed from a housing structure in accordance with an embodiment of the present invention.

FIG. 3 is perspective view of an exemplary embodiment of device 10 with convex display 14 and convex housing 12 in which housing 12 has an opening 300 that may provide access to, e.g., an audio port. A portion of housing 12 may form a bezel such as bezel 304. Bezel 304 may be formed so that bezel 304 and display 14 form a common smooth surface or may be formed raised above or depressed below the outer surface of display 14. Bezel 304 may be a separate bezel member or may be formed as a portion of housing 12. As shown in FIG. 3, top and bottom portions 306 of bezel 200 may have a convex (curved) shape that matches the cross-sectional curved shape of convex display 14.

Figure 4:
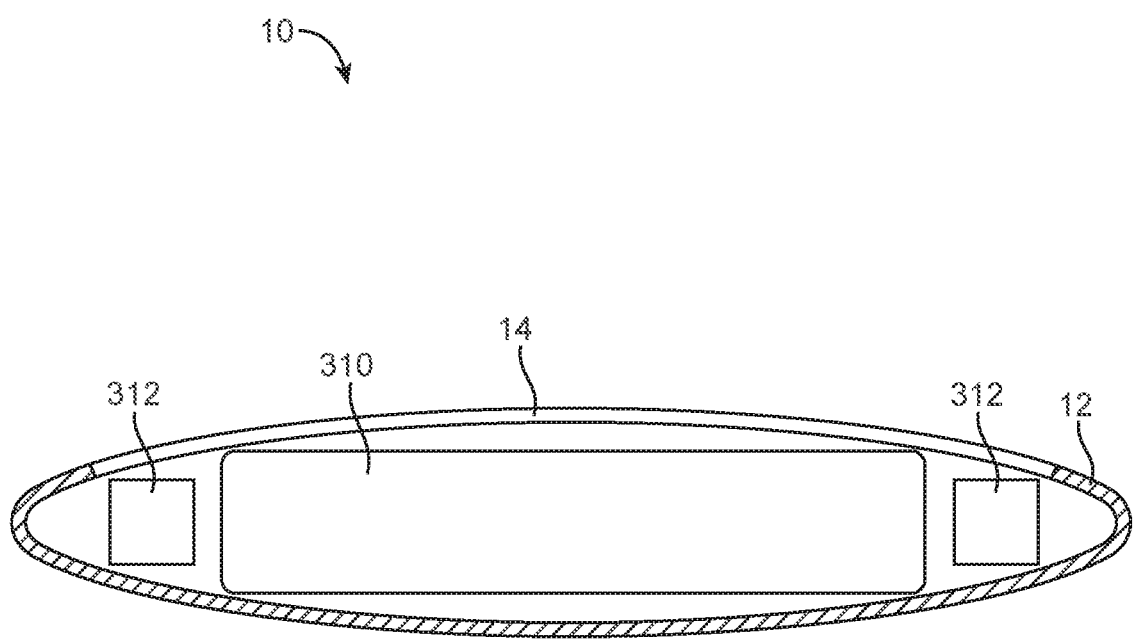
FIG. 4 is a cross-sectional side view of an illustrative electronic device with a convex display and internal components in accordance with an embodiment of the present invention.

FIG. 4 is a cross-sectional side view of an illustrative embodiment of device 10 taken along line 302 of FIG. 3 and viewed in direction 303. As shown in FIG. 4, device 10 has a convex shape formed by convex housing 12 and convex display 14. Device 10 may also include internal components such as battery 310 and components 312. The convex shape of housing 12 and display 14 of device 10 may provide device 10 with a thin appearance while providing an interior space that is able to accommodate internal components such as battery 310.

Figure 5:
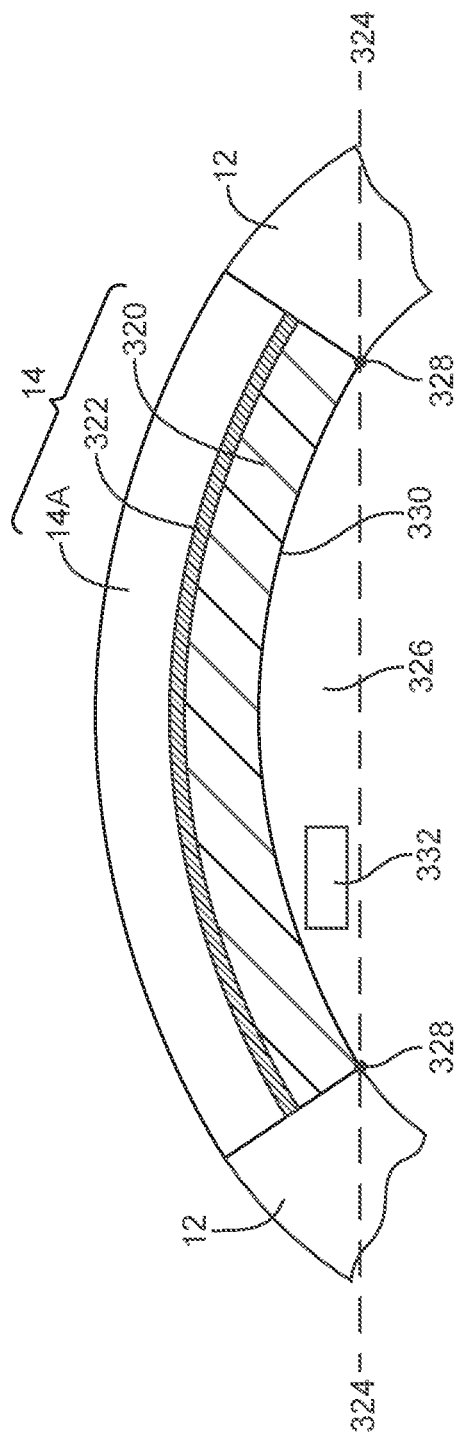
FIG. 5 is a cross-sectional side view of a portion of an illustrative electronic device having a convex display with a flexible display layer that conforms to a support structure in accordance with an embodiment of the present invention.

FIG. 5 is a cross-sectional side view of an illustrative embodiment of device 10 in which convex display 14 is formed by mounting flexible display layer 14A to a convex support structure such as support structure 320 (e.g., a rigid support structure having at least a convex external surface such as a metal, glass, or plastic support structure) using a layer of adhesive material such as adhesive layer 322. As shown in FIG. 5, the internal volume of device 10, defined by housing 12 and convex display 14 may include volume 326 above plane 324 (defined by inner edges 328 of display 14) and below inner surface 330 of display 14. This is because inner surface 330 of support structure 320 is concave (in the FIG. 5 example). Volume 326 provides space which may be used for placement of internal components such as component 332 (e.g., printed circuit boards, antennas or other components). The ability to bend flexible display layer 14A into the convex shape of FIG. 5 that matches the convex outer surface of support structure 320 may therefore help maximize the interior space that is available within device 10 to mount device components.

Figure 6:
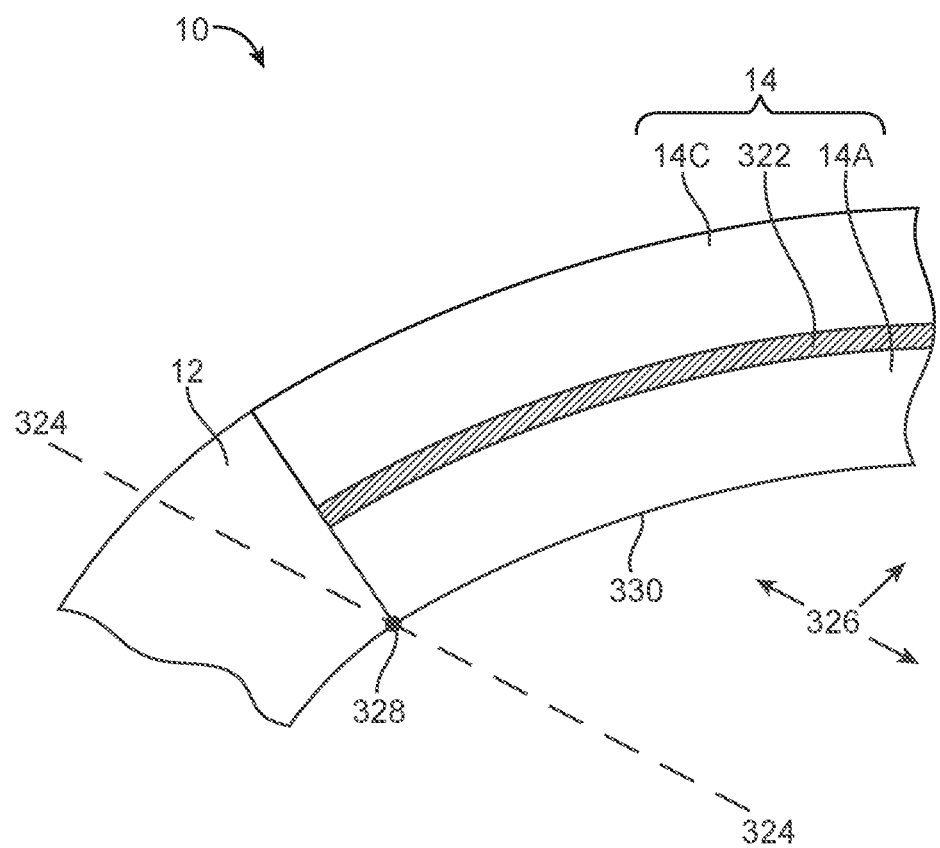
FIG. 6 is a cross-sectional side view of a portion of an illustrative electronic device having a convex cover layer and a flexible display layer joined by an adhesive layer in accordance with an embodiment of the present invention.

FIG. 6 is a cross-sectional side view of a portion of device 10. In the illustrative embodiment of FIG. 6, convex display 14 is formed from flexible display layer 14A, adhesive layer 322, and rigid cover layer 14C (e.g., a layer of rigid plastic or a layer of rigid cover glass having a convex external surface and a concave inner surface to which flexible display layer 14A conforms). Convex display 14 may be formed adjacent to bezel portion housing 12 or may be joined to housing 12 by an additional mounting member. Providing device 10 with a layer such as flexible display layer 14A that conforms to the convex shape of cover layer 14C (i.e., so that layer 14A conforms to the concave inner surface of layer 14C) may provide additional internal volume 326 between plane 324 (defined by inner edges 328 of display 14) and inner surface 330 of display 14.

Figure 7:
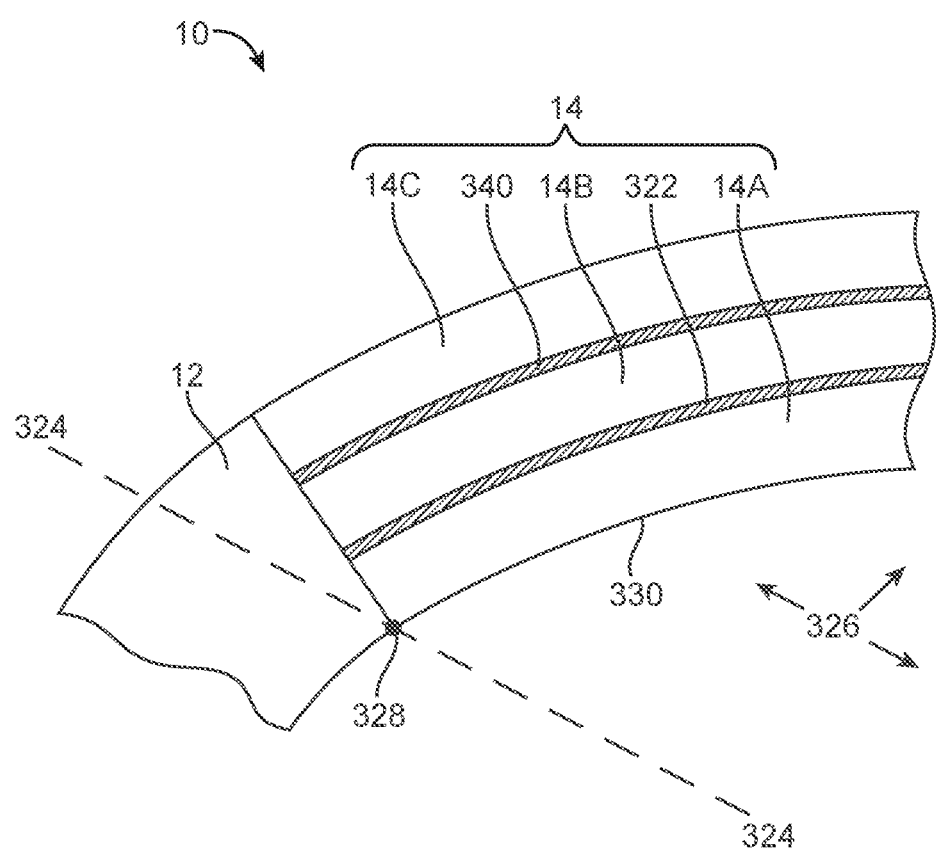
FIG. 7 is a cross-sectional side view of a portion of an illustrative electronic device having a flexible display layer, a touch-sensitive layer and a convex cover layer joined by adhesive layers in accordance with an embodiment of the present invention.

FIG. 7 is a cross sectional side view of a portion of another embodiment of device 10. In the illustrative embodiment of FIG. 7, convex display 14 is formed from flexible display layer 14A attached to optional touch-sensitive layer 14B by adhesive layer 322. Touch-sensitive layer 14B may further be attached to rigid cover layer 14C (e.g., a glass or plastic layer) using adhesive layer 340 such that all layers (322, 14B, 340, and 14C) of display 14 conform to the convex shape of cover layer 14C (i.e., so that layers 14A and 14B conform to the concave inner surface of cover layer 14C). Convex display 14 may be formed adjacent to housing 12 or may be joined to housing 212 by an additional mounting member. The convex shape of all layers (14A, 322, 14B, 340, and 14C) may combine with convex housing 12 to provide a thin appearance for device 10 and may provide additional internal volume 326 between plane 324 (defined by inner edges 328 of display 14) and inner surface 330 of display 14.

Figure 8:
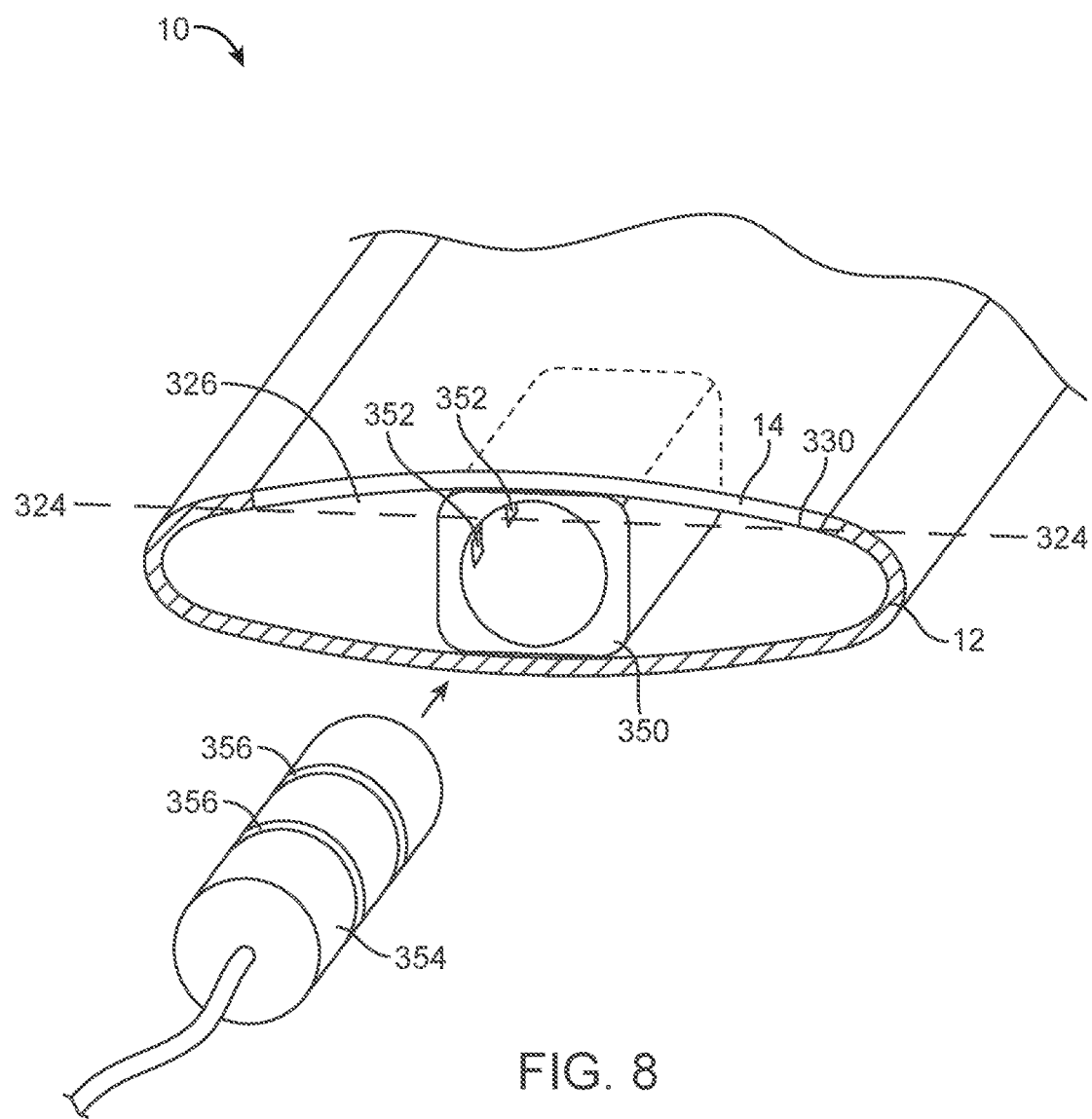
FIG. 8 is a cross-sectional perspective view of an illustrative electronic device having a convex display and a connector port arranged to use the internal volume of the device in accordance with an embodiment of the present invention.

FIG. 8 is a cross-sectional perspective view of an illustrative electronic device 10 in the vicinity of a connecting structure such as connecting structure 350 (e.g. an audio port or other female connector). As shown in FIG. 8, audio port 350 may have electrical contacts 352 for mating with contacts 356 of a connector such as mating connector 354 (e.g., a mating audio plug or other male connector). In the embodiment of FIG. 8, a portion of audio port 350 may occupy a portion of internal volume 326 above plane 324 (defined by inner edges 328 of display 14). The convex shape of display 14 of device 10 may provide a thin appearance and may provide additional internal volume 326 between plane 324 (defined by inner edges 328 of display 14) and inner surface 330 of display 14 in which a portion of mating connectors such as connector 350 may be mounted.

Figure 9:
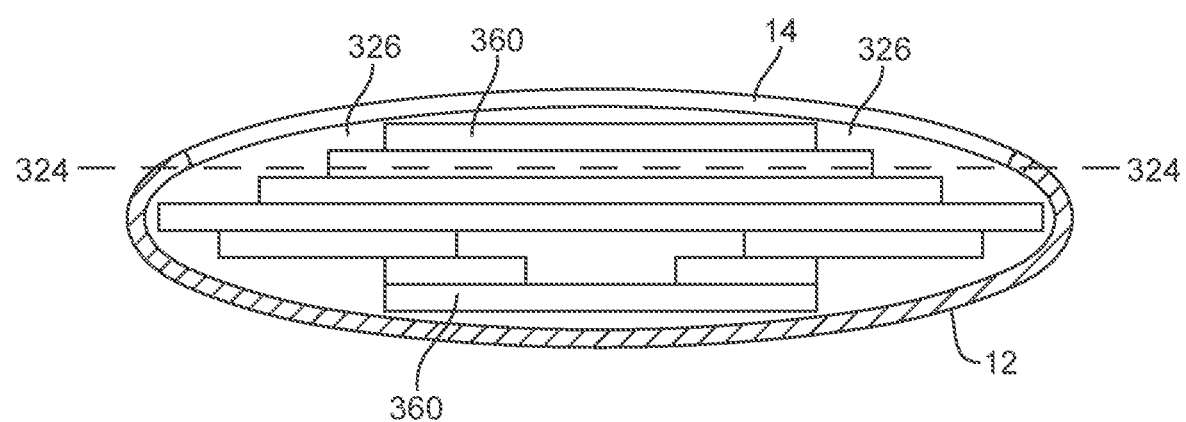
FIG. 9 is a cross-sectional perspective view of an illustrative electronic device having a convex display and internal components in accordance with an embodiment of the present invention.

FIG. 9 is a cross-sectional side view of an illustrative electronic device 10 in the vicinity of a stack of components 360 such as printed circuit boards (PCBs), sensors, switches, connectors, battery structures, or other electronic components. In the embodiment shown in FIG. 9, some components 360 may be mounted partially or completely in a portion of internal volume 326 above plane 324 (defined by inner edges 328 of display 14). The convex shape of display 14 of device 10 may provide a thin appearance and may provide additional internal volume 326 between plane 324 (defined by inner edges 328 of display 14) and inner surface 330 of display 14 in which PCBs and other components 360 may be mounted. The example of FIG. 10 in which components 360 are mounted in volume 326 is merely illustrative. Other components or structures may occupy volume 326, if desired.

Figure 10:
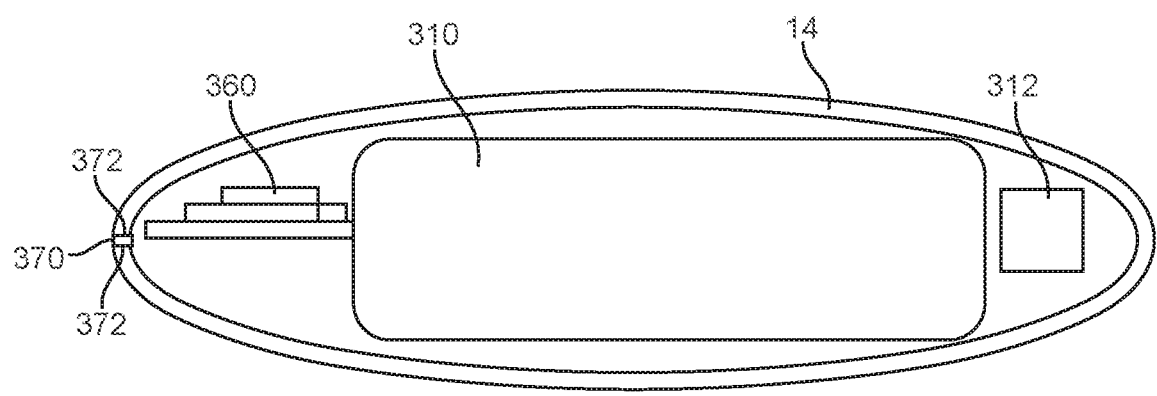
FIG. 10 is a cross-sectional side view of an illustrative electronic device substantially surrounded by a convex display in accordance with an embodiment of the present invention.

FIG. 10 is a cross-sectional side view of an illustrative electronic device in which display 14 of device 10 completely surrounds device 10. As shown in FIG. 10, device 10 may have convex front (upper) and rear (lower) surfaces that are joined along curved sidewalls. Display 14 may cover the front, rear, and sidewall surfaces of device 10 so as to completely surround electrical components 360 (e.g., printed circuit boards, integrated circuits, switches, sensors, etc.). Edges 372 may be joined by a joining member such as joining member 370. Member 370 may be a separate member formed of plastic, glass, ceramics, fiber composites, metal (e.g., stainless steel, aluminum, etc.), other suitable materials, or a combination of these materials, or may be formed from an adhesive material.

In the example of FIG. 10, display 14 may be formed by stacking multiple layers including flexible display layer 14A, touch-sensitive layer 14B, and cover layer 14C. Display 14 may also include other layers of material such as adhesive layers, optical films, or other suitable layers. As an example, display 14 may be formed by mounting flexible display layer 14A to a rigid convex support structure having one or more convex outer surfaces and one or more associated concave inner surfaces that completely surrounds device 10. In another configuration, display 14 may be formed from flexible display layer 14A, adhesive layer 322, and rigid cover layer 14C (e.g., a rigid cover layer with one or more convex outer surfaces and one or more associated concave inner surfaces). In another possible configuration, convex display 14 may be formed by attaching flexible display layer 14A to optional touch-sensitive layer 14B using adhesive layer 322. Touch-sensitive layer 14B may further be attached to rigid cover layer 14C (e.g., a glass or plastic layer) using adhesive layer 340 so that all layers (322, 14B, 340, and 14C) of display 14 conform to the convex shape of cover layer 14C. These examples are merely illustrative and other configurations of display 14 may be used.

The convex shape of display 14 of device 10 may provide a thin appearance for device 10 and may help to maximize the internal volume of the device in which components such as battery 310, PCBs 360 or other components such as component 312 may be mounted. Surrounding device 10 completely with convex display 14 may allow the area of a device available for visual display to be enlarged.

The foregoing is merely illustrative of the principles of this invention and various modifications can be made those skilled in the art without departing from the scope and spirit of the invention.

What is claimed is:

1. An electronic device having first and second opposing surfaces, comprising:
   a housing comprising a glass portion and having a metal portion that forms at least part of a sidewall;
   a first display portion on the first surface, wherein the first display portion displays images through the glass portion of the housing;
   a second display portion on the second surface; electronic components interposed between the first and second display portions.

2. The electronic device defined in claim 1 wherein the housing comprises an additional glass portion and wherein the second display portion displays images through the additional glass portion.

3. The electronic device defined in claim 1 wherein the first display portion comprises organic light-emitting diode pixels.

4. The electronic device defined in claim 1 wherein the first display portion has a curved edge portion.

5. The electronic device defined in claim 4 wherein the first and second display portions are joined by the curved edge portion.

6. The electronic device defined in claim 5 wherein the glass portion has a curved portion that covers the curved edge portion.

7. The electronic device defined in claim 1 wherein the images extend from the first display portion to the second display portion.

8. The electronic device defined in claim 1 wherein the first and second display portions are separated by a portion of the housing.

9. The electronic device defined in claim 8 wherein the portion of the housing is located along a sidewall of the electronic device.

10. An electronic device, comprising:
    a display that wraps from a front surface of the electronic device to a back surface of the electronic device;
    a metal sidewall located between the front and back surfaces;
    a transparent cover layer through which the display displays images on the front and back surfaces; and
    electronic components located between the front and back surfaces.

11. The electronic device defined in claim 10 wherein the transparent cover layer comprises glass.

12. The electronic device defined in claim 10 wherein the display comprises organic light-emitting diode pixels.

13. The electronic device defined in claim 10 wherein the display comprises a curved portion.

14. The electronic device defined in claim 13 wherein the curved portion is located along a sidewall of the electronic device.

15. An electronic device, comprising:
    a housing having a metal member;
    a first display region with first pixels on a front surface of the electronic device;
    a second display region with second pixels on a back surface of the electronic device, wherein the metal member separates the first and second display regions; and
    electronic components located between the first and second display regions.

16. The electronic device defined in claim 15 wherein the first pixels in the first display region and the second pixels in the second display region comprise organic light-emitting diode pixels.

17. The electronic device defined in claim 15 further comprising a glass cover layer overlapping the first display region.

18. The electronic device defined in claim 17 wherein the first display region has a curved edge.

19. The electronic device defined in claim 18 wherein the glass cover layer has a curved portion overlapping the curved edge of the first display region.

* * * * *